United States Patent
Stotz

(10) Patent No.: US 12,259,022 B2
(45) Date of Patent: Mar. 25, 2025

(54) DRIVE APPARATUS FOR ADJUSTMENT DEVICES OF MOTOR VEHICLES COMPRISING AN AT LEAST TWO-PART HOUSING, AND METHOD FOR MOUNTING SUCH A DRIVE APPARATUS

(71) Applicant: Küster Holding GmbH, Ehringshausen (DE)

(72) Inventor: Manuel Stotz, Weinbach (DE)

(73) Assignee: Küster Holding GmbH, Ehringshausen (DE)

( * ) Notice: Subject to any disclaimer, the term of this patent is extended or adjusted under 35 U.S.C. 154(b) by 75 days.

(21) Appl. No.: 17/766,819

(22) PCT Filed: Nov. 3, 2020

(86) PCT No.: PCT/EP2020/080734
§ 371 (c)(1),
(2) Date: Apr. 6, 2022

(87) PCT Pub. No.: WO2021/089498
PCT Pub. Date: May 14, 2021

(65) Prior Publication Data
US 2023/0055417 A1    Feb. 23, 2023

(30) Foreign Application Priority Data
Nov. 14, 2019 (DE) .......................... 102019129655.2

(51) Int. Cl.
*F16H 57/031* (2012.01)
*B62D 65/02* (2006.01)
(Continued)

(52) U.S. Cl.
CPC .............. *F16H 19/02* (2013.01); *B62D 65/02* (2013.01); *F16H 57/02* (2013.01); *H02K 7/116* (2013.01);
(Continued)

(58) Field of Classification Search
CPC ........ B62D 65/02; E05F 11/505; E05F 15/60; E05Y 2900/55; E05Y 2201/434; F16H 2057/02082; F16H 2057/02034
See application file for complete search history.

(56) References Cited

U.S. PATENT DOCUMENTS

| 3,879,623 A | 4/1975 | Shiuichi |
| 6,629,905 B1 | 10/2003 | Sesselmann |

(Continued)

FOREIGN PATENT DOCUMENTS

| DE | 29924088 U1 | 11/2001 | |
| DE | 102007004665 A1 * | 9/2008 | ............ E05F 15/689 |

(Continued)

OTHER PUBLICATIONS

Video titled "2013 Ford Focus Window Motor Replacement Without Removing Regulator or window" by "Todd's Garage," uploaded on Sep. 5, 2019 and publicly available at https://www.youtube.com/watch?v=7G1RWBWirPA (Year: 2019).*

Primary Examiner — Randell J Krug

(74) Attorney, Agent, or Firm — Rogowski Law LLC

(57) ABSTRACT

A drive apparatus for adjustment devices of components of motor vehicles, such as, but not limited to, power windows, cargo area covers, and sunroofs, has an at least two-part housing (1). An electric drive unit (2) and a gear unit (3) that is operatively connected to the electric drive unit are arranged in the housing (1). The housing (1) is designed as part of the gear unit (3).

11 Claims, 5 Drawing Sheets

(51) Int. Cl.
  *F16H 19/02*   (2006.01)
  *F16H 57/02*   (2012.01)
  *H02K 7/116*   (2006.01)
  *H02K 11/33*   (2016.01)

(52) U.S. Cl.
  CPC .... *H02K 11/33* (2016.01); *F16H 2057/02034* (2013.01); *F16H 2057/02082* (2013.01); *H02K 2211/03* (2013.01)

(56) References Cited

U.S. PATENT DOCUMENTS

| | | | |
|---|---|---|---|
| 7,038,338 B2 | 5/2006 | Sesselmann | |
| 7,276,009 B2 | 10/2007 | Boernchen | |
| 7,354,370 B2 | 4/2008 | Sesselmann | |
| 8,450,896 B2 * | 5/2013 | Weber | F02D 9/107 |
| | | | 310/91 |
| 9,705,380 B2 * | 7/2017 | Nagase | H02K 5/145 |
| 2014/0319948 A1 | 10/2014 | Yuichi | |
| 2018/0045292 A1 * | 2/2018 | Richter | F16H 57/021 |
| 2019/0110368 A1 | 4/2019 | Liskow | |

FOREIGN PATENT DOCUMENTS

| | | | | |
|---|---|---|---|---|
| EP | 0898038 A2 * | 2/1999 | | |
| EP | 1284042 B2 | 6/2004 | | |
| EP | 1529145 B1 | 3/2006 | | |
| EP | 1212825 B1 | 1/2008 | | |
| EP | 166470 B1 | 7/2008 | | |
| EP | 2418760 A2 * | 2/2012 | ............ | H02K 11/38 |
| EP | 2790302 B1 | 10/2014 | | |
| EP | 3530414 A1 | 8/2019 | | |

* cited by examiner

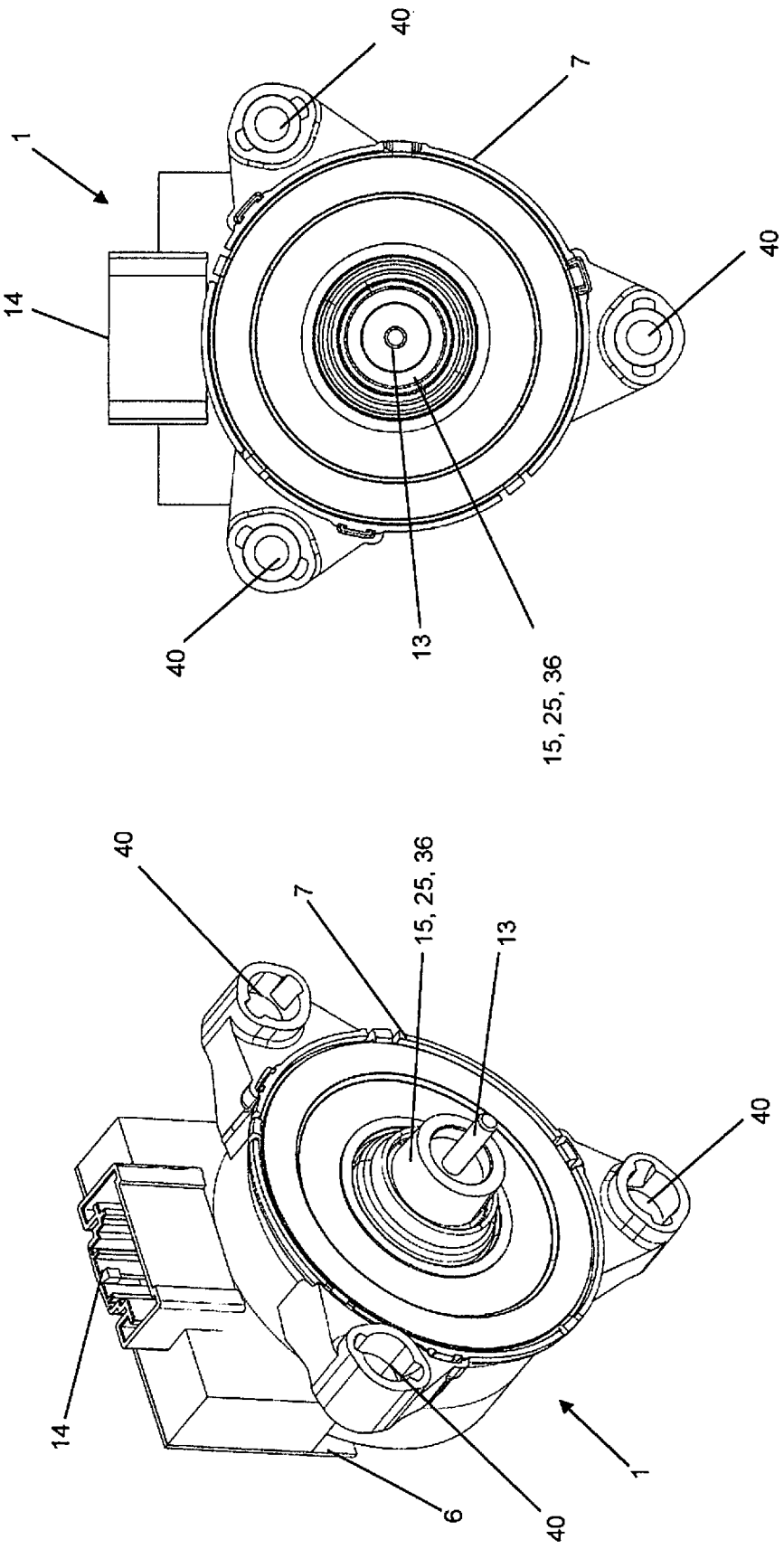

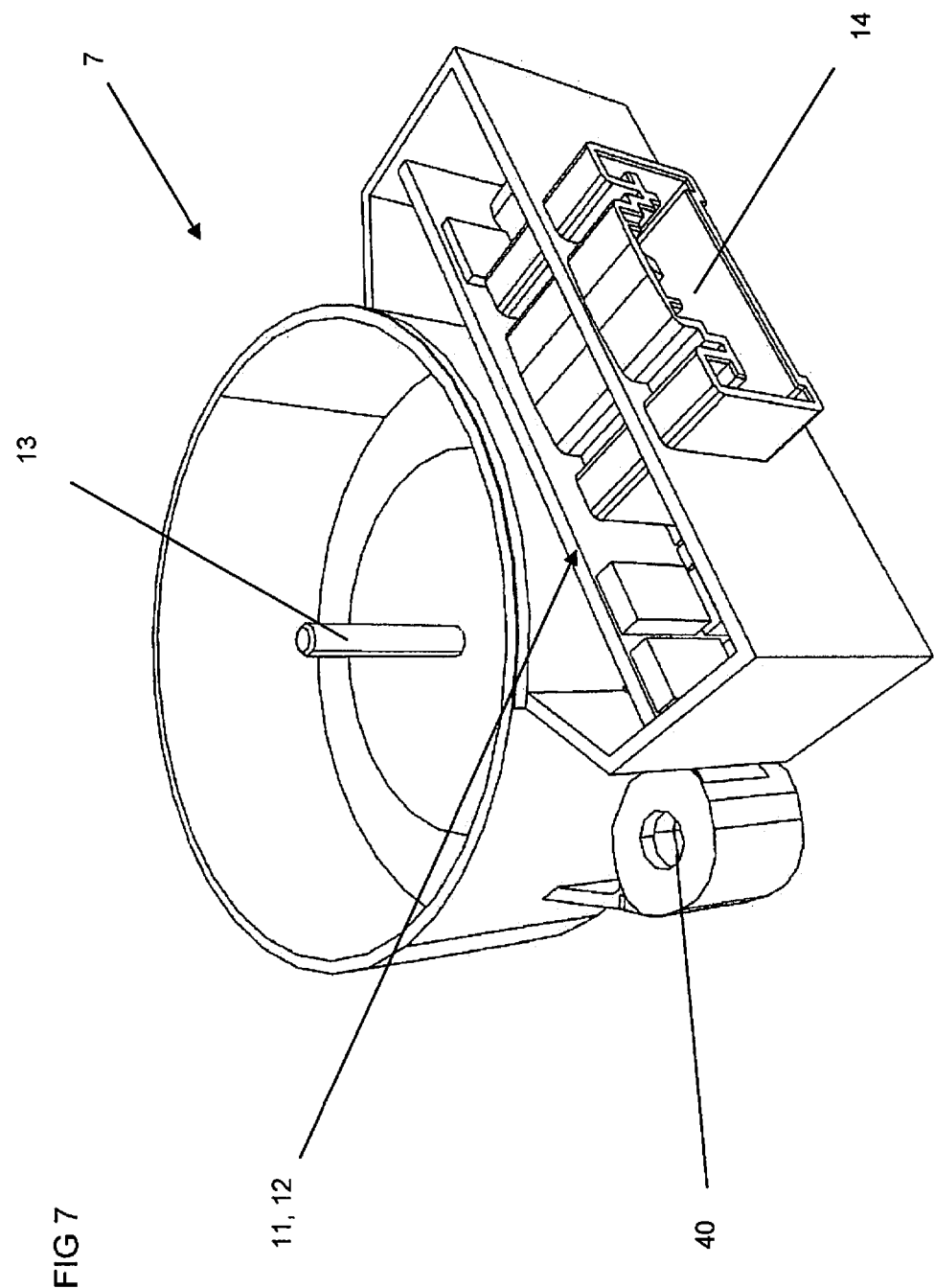

DRIVE APPARATUS FOR ADJUSTMENT DEVICES OF MOTOR VEHICLES COMPRISING AN AT LEAST TWO-PART HOUSING, AND METHOD FOR MOUNTING SUCH A DRIVE APPARATUS

CROSS-REFERENCE TO RELATED APPLICATIONS

This application is a national stage application (under 35 USC § 371) of PCT/EP2020/080734, filed Nov. 3, 2020, which claims benefit of DE 102019129655.2, filed Nov. 4, 2019, the contents of each of which is incorporated by reference herein.

BACKGROUND OF THE INVENTION

Technical Field and State of the Art

The invention relates to a drive apparatus for adjustment devices of motor vehicles comprising an at least two-part housing are often employed as drives for power window actuators and cargo area covers.

Such drive apparatuses are disclosed, for example, in European patents EP 1 212 825 B1, EP 666 470 B1, EP 1 159 145 B1 and European Revised Patent EP 1 284 042 B2. In this context, EP 1 666 470 B1 and EP 1 212 825 B1 as well as EP 1 159 145 B1 disclose an adjustment drive in which the disc motor is used in combination with a planetary gear. European Revised Patent EP 1 284 042 B2 discloses a drive unit in which a disc motor is employed in combination with a harmonic gear. All of these prior-art drive apparatuses for adjustment devices of motor vehicles have in common the fact that a drive unit is operatively connected to a gear unit and this combination is arranged in a housing that is configured for installation in the motor vehicle where it is going to be used.

Throughout the automotive realm, requirements are moving more and more towards weight reduction so as to lower the consumption of energy during operation of the motor vehicle. Moreover, the components and thus also drive apparatuses for adjustment devices of motor vehicles are supposed to have a compact configuration in order to make use of the available installation space in the most effective manner possible. For purposes of minimizing the logistics, the number of parts in the individually used components should be kept as low as possible.

Before this backdrop, it is an objective of the invention to refine a drive apparatus for adjustment devices of motor vehicles in such a way that, on the one hand, the weight as well as the number of parts can be reduced and, on the one hand, a more compact design can be achieved. Moreover, it is an objective of the invention to refine a method for mounting a drive apparatus for adjustment devices of motor vehicles comprising an at least two-part housing in such a way that said apparatus can be mounted regardless of the installation position when it comes to adjusting the adjustment device.

SUMMARY OF THE INVENTION

In this context, the inventive drive apparatus for adjustment devices of motor vehicles comprises an at least two-part housing in which an electric drive unit and an operatively connected gear unit are arranged. The drive apparatus is also characterized in that the housing is configured as part of the gear unit.

The inventive configuration of a drive apparatus for adjustment devices of motor vehicles achieves, on the one hand, a reduction in the number of parts since the housing assumes the task of part of the gear so that it is consequently possible to dispense with a separate gear component inside the housing. Moreover, the use of the housing as a gear component also translates into a more compact design, something which also leads to a reduction in the weight of the entire drive apparatus and thus into lower energy consumption during operation of the motor vehicle.

According to a first advantageous embodiment of the invention, it is provided for internal teeth to be arranged on the housing for purposes of intermeshing with external teeth of a part of the gear unit. This configuration of the invention allows the housing to become part of the gear unit. The external teeth of a part of the gear unit are operatively connected to the internal teeth arranged on the housing, especially in its interior. This measure means that the housing assumes the task of a part of the drive so that a separate gear component inside the housing can be dispensed with since this task is now taken over by the housing.

In a refinement of the invention, it has proven to be advantageous for the at least two-part housing to have a cover element and a receptacle element. The drive unit, together with the rest of the gear unit, can then be inserted into the receptacle element, wherein the housing is closed by putting the cover element in place. At the latest when the cover element is put in place or when the housing is closed, the housing starts to function as part of the gear unit in that, inside the housing, the internal teeth become operatively connected to the external teeth of a part of the rest of the gear unit.

In this context, it can be provided for the cover element of the housing to be configured as part of the gear unit. As an alternative, it can also be provided for the receptacle element of the housing to be configured as part of the gear unit. In both configurations, it is easily possible for the housing to function as part of the gear unit and for the entire drive apparatus to be mounted for use in a motor vehicle.

In this context, it is provided for the internal teeth to be arranged on the cover element or on the receptacle element of the housing. As a result, another corresponding part of the gear that is configured to be operatively connected to the cover element or to the receptacle element of the housing then becomes operatively connected to the cover element or to the receptacle element of the housing via corresponding external teeth.

According to another idea of the invention, it is provided for the drive apparatus to have an electric motor, especially a brushless electric motor, as the drive unit. Such electric motors have proven their worth in the automotive sector for purposes of providing the drive for adjustment devices of this kind, and they can easily be employed with the drive apparatus according to the invention, without creating the need for complex development work in this area before they are ready for serial production.

Moreover, various gears can be used in the apparatus according to the invention. Consequently, but not exclusively, eccentric gears, for instance, cycloid gears or harmonic gears or else planetary gears or the like can be employed in the inventive drive apparatus for adjustment devices of motor vehicles. Such gears have also proven their worth in many realms of automotive engineering that make use of electric drives so that no complex development work is needed here in order to be ready for serial production. All of these gears also comprise corresponding parts having external teeth that can be operatively connected to internal teeth arranged inside the housing.

The use of a cycloid gear has proven to be advantageous when a cycloid gear having two disks is being used.

According to another idea of the invention, the drive apparatus for adjustment devices of motor vehicles also has a control unit for the drive unit. This control unit allows the drive unit to be actuated and controlled in accordance with the desired requirements.

In this context, it has proven its worth for the control unit to be arranged on a printed circuit board, especially on a flexible printed circuit board, wherein the printed circuit board is preferably configured as a printed circuit with preferably integrated circuits or with switching circuitry. Control units configured in this manner can be arranged very flexibly inside a housing and can also be adapted to the shape of the housing or to the installation space available in it. Therefore, the housing assumes a dual function in that, on the one hand, it protects the printed circuit board from external influences and, on the other hand, it functions as part of the gear unit.

It is also provided for the printed circuit board to be arranged inside the housing since this is where it is protected against external influences during operation of the drive apparatus for adjustment devices of a motor vehicle.

In this context, the printed circuit board is contacted, for example, by means of press-in technology or blade contact terminals.

Again with an eye towards minimizing the installation space and thus achieving an even more compact design of the drive apparatus according to the invention, it is provided for the printed circuit board to be arranged inside the housing parallel to the drive shaft of the drive unit. This further reduces the installation depth of the drive apparatus according to the invention in the direction of the shaft of the drive unit.

It is also advantageous for the drive unit to be configured rotationally symmetrically to the gear unit inside the at least two-part housing. This configuration of the invention brings about a greater degree of freedom during the installation since this eliminates left/right variants of the drive apparatus. For instance, the same drive apparatus can be installed for use as adjustment devices in power window actuators on the left side as well as on the right side of the motor vehicle. The rotationally symmetrical configuration of the drive unit with the gear unit requires only a universal drive apparatus or drive variant or gear motor. Moreover, when it comes to power window actuators or the like comprising adjustment devices actuated by a cable, this translates into a greater degree of freedom for the cable lead-off of the adjustment device.

It is also advantageous for the adjustment device, for example, a power window actuator, to be pre-installed on the vehicle body. The pre-installation of a cable drum housing of a power window actuator is likewise pre-installed at the time of such installation. For this purpose, fastening lugs are pushed through drilled holes in the car body part and pre-installed on the car body along with latching hooks arranged on the fastening lugs. Receptacles corresponding to the fastening points are formed on the drive apparatus and these serve to surround the fastening lugs of the cable drum housing. Cutouts that serve to receive the latching hooks are provided in the receptacles on the sides of the drilled hole.

In this context, it is advantageous if the orientation of these receptacles is configured so as to be rotationally symmetrical. This is also a prerequisite for the drives to be universally used for the left-hand and the right-hand sides of the vehicle.

The method according to the invention for mounting the above-mentioned drive apparatus for adjustment devices of motor vehicles is characterized in that the adjustment device is mounted on or fastened to a car body or else on a component connected to the car body before the drive apparatus is mounted on the adjustment device. As a result, for example, when the adjustment devices are used as power window actuators, the pre-installation of door modules can be optimized since, after the power window actuator has been installed, the now universal drive apparatus can be employed equally for left-hand as well as right-hand door modules.

According to the invention, the drive apparatus can be mounted on left-hand as well as right-hand variants of the adjustment device of motor vehicles.

Moreover, when it comes to motor vehicle adjustment devices that are actuated by cables, the drive apparatus can be installed independently of the layout of the cable of the cable-actuated adjustment device.

In this context, the term cable refers to a spiral or round-strand cable that optionally can also run in an outer sleeve. However, it is likewise possible to employ a push-pull cable such as, for instance, a helix cable; the fundamental structure of a helix cable is described, for example, in German patent application DE 10 2007 041 233 A1.

Furthermore, a component adjustment device of a motor vehicle with a drive apparatus according to the invention as described above is also to be protected.

Such component adjustment devices are employed in motor vehicles in order to use an electric motor to adjust a wide array of components. Non-exclusive examples here are power window actuators, cargo area covers and sunroofs, so that in these examples, the component adjustment device of a motor vehicle is configured as an adjustment device for a power window actuator, for a cargo area cover or else for a sunroof.

Additional objectives, advantages, features and application possibilities of the present invention ensue from the description below of embodiments, making reference to the figures. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

The following is shown:

FIG. 1 an embodiment of a drive apparatus according to the invention, in a perspective view;

FIG. 2 a drive apparatus as shown in FIG. 1, in a top view perpendicular to the driven shaft;

FIG. 7 a detailed view of an embodiment of a receptacle element of the housing 1.

DETAILED DESCRIPTION

Figure 3:
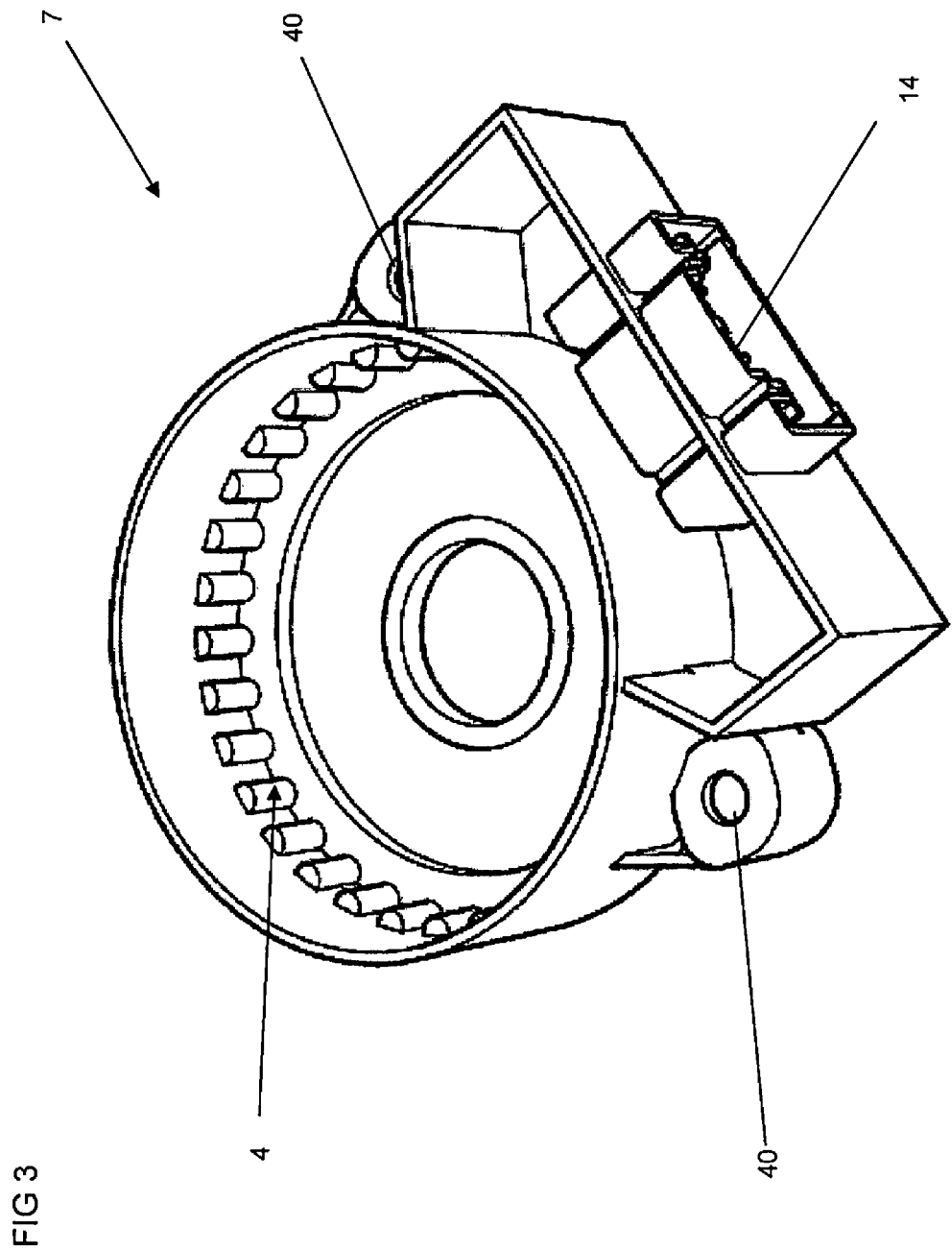
FIG. 3 a detailed view of a receptacle element of the housing as shown in FIGS. 1 and 2.

FIG. 1 shows an embodiment of a drive apparatus according to the invention for a drive device of motor vehicles.

Here, a housing 1 accommodates a drive unit (not tensioned here) that is operatively connected to a gear unit (likewise not tensioned here) which is likewise arranged in the housing 1. The housing 1 is configured so as to consist of two parts and it comprises the receptacle element 7 that can be closed by a cover element 6.

The receptacle element 7 has an opening out of which a pinion 15, 25, 35 as well as a driven shaft 13 of the gear unit 3 protrude. The exact arrangement of the pinion 15, 25, 35 and of the driven shaft 13 can also be seen in the top view of the housing 1 as shown in FIG. 2. Moreover, FIGS. 1 and 2 show electric connection elements 14 by means of which a control unit located inside the housing 1 as well as the electric drive unit inside the housing 1 can be supplied with electric energy.

FIG. 3 then depicts an interior view of the receptacle element 7 of the housing 1 shown in FIGS. 1 and 2. Clearly visible are internal teeth 4 inside the receptacle element 7. The connection elements 14 are also shown here.

For installation purposes, an adjustment device, for instance, of a power window actuator, is configured so that it can be pre-installed on a car body. The pre-installation of a cable drum housing of the power window actuator is likewise carried out during such a pre-installation. For this purpose, fastening lugs are inserted through holes drilled into the car body and then pre-installed on the car body along with latching hooks arranged on the fastening lugs. Receptacles 40 corresponding to the fastening points are formed on the drive apparatus and these serve to surround the fastening lugs of the cable drum housing. Cutouts that serve to receive the latching hooks are provided in the receptacles on the sides of the drilled hole.

Here, the receptacles 40 are configured so as to be rotationally symmetrical by 120°. This is also a prerequisite for the drives to be universally used for the left-hand side and the right-hand side of the vehicle. This rotationally symmetrical configuration of the receptacles 40 can be seen in FIGS. 1 to 3 as well as in FIGS. 4 to 6 described below.

Figure 4:
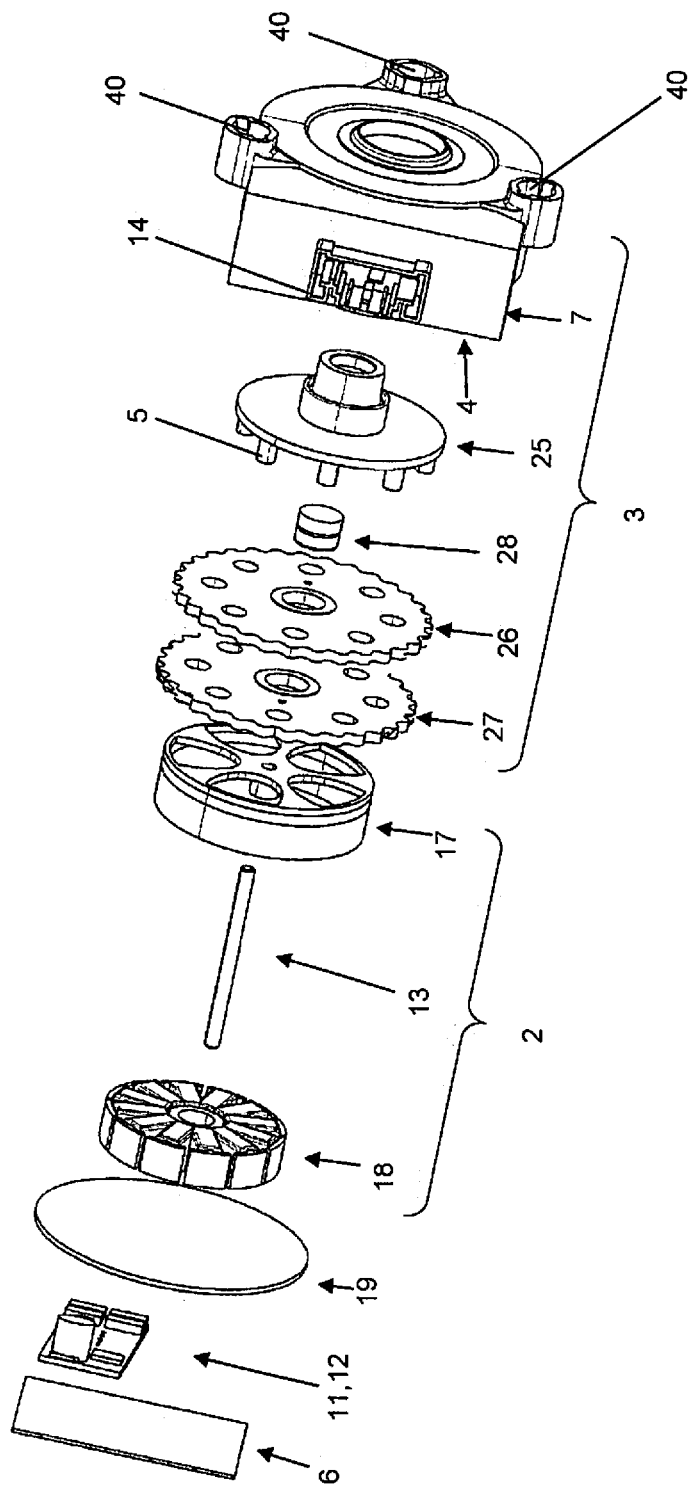
FIG. 4 an exploded view of a first embodiment of a drive apparatus according to the invention.

FIG. 4 shows an exploded view of a first embodiment of the interior of the housing 1. A drive unit 2 can be seen which consists of a rotor 17 and a stator 18, and which is operatively connected to a driven shaft 13. The drive unit 2 is arranged on a support plate 19, wherein a printed circuit board 12—on which there is a control unit 11 for the drive unit 2—is arranged between the support plate 19 and the cover element 6 of the housing 1.

Moreover, as the gear unit 3, the drive apparatus shown in FIG. 3 has an eccentric gear in the form of a cycloid gear having a first cam 26 and a second cam 27 as well as an eccentric tappet 28 and a pinion 25 that is operatively connected thereto. Here, external teeth 5 have been formed on the pinion. During operation of the drive apparatus, the external teeth 5 are operatively connected to the internal teeth 4 that have been formed inside the receptacle element 7 of the housing 1, so that the receptacle element 7 of the housing 1 is a part of the cycloid gear.

Figures 5, 6:
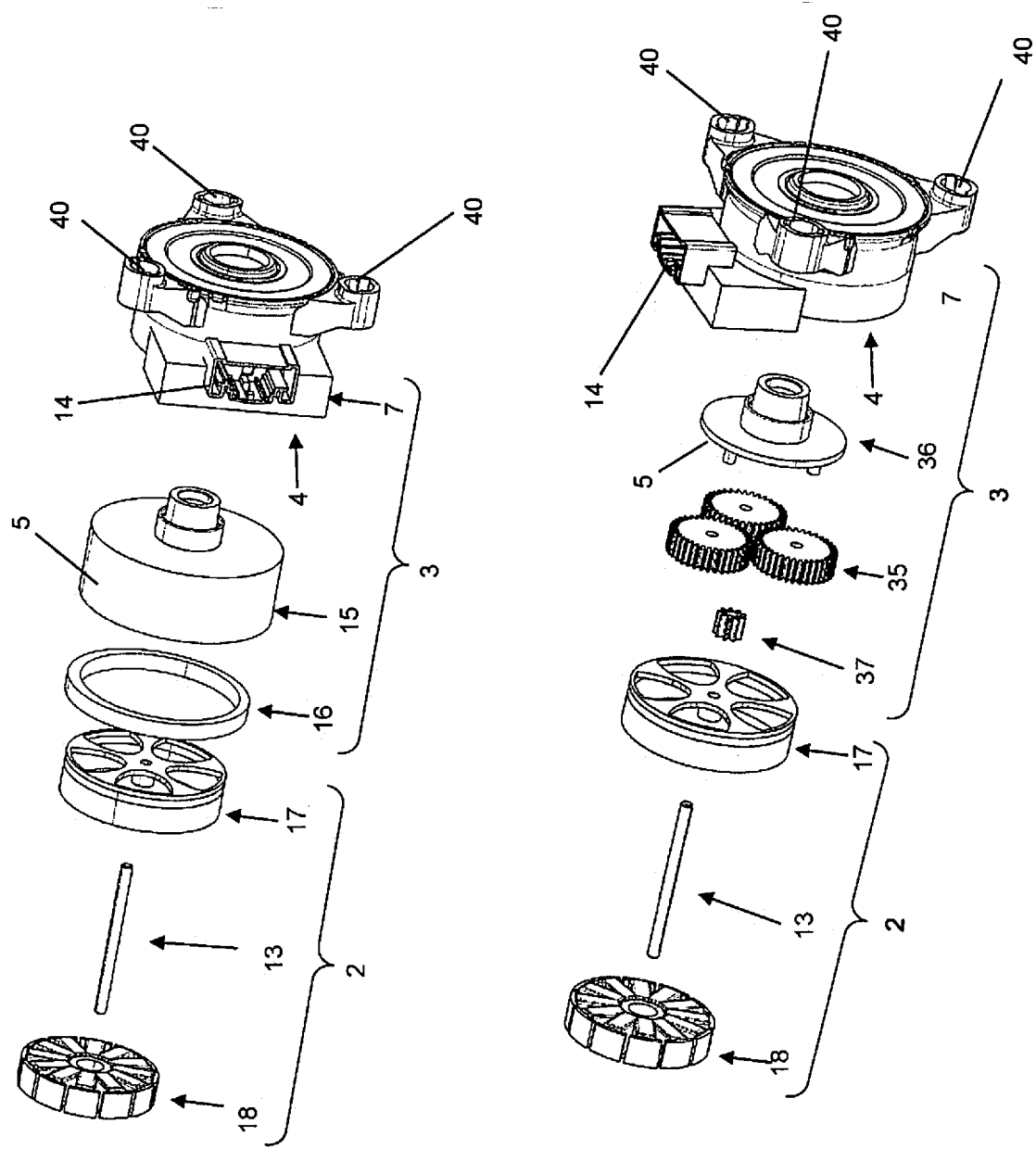
FIG. 5 a second embodiment of a drive apparatus according to the invention, in an exploded view.
FIG. 6 a third embodiment of a drive apparatus according to the invention, in an exploded view.

FIG. 5 shows an exploded view of a second embodiment of the interior of the housing 1 depicted in FIGS. 1 and 2. Here, too, the drive unit consists of a brushless electric motor having a stator 18 and a rotor 17 as well as a driven shaft 13 corresponding to the embodiment shown in FIG. 3. The drive unit 2 is arranged on a support plate 19, wherein a printed circuit board 12—on which there is a control unit 11 for the drive unit 2—is arranged between the support plate 19 and the cover element 6 of the housing 1. In this embodiment, however, the gear unit 3 is configured as a strain wave gear in the form of a harmonic gear. The gear unit 3 shown in FIG. 4 has a flex spline 15 that is configured as a pinion and that is provided with external teeth 5. The external teeth 5 are operatively connected to internal teeth 4 arranged inside the receptacle element 7 of the housing 1. In this embodiment as well, owing to the operative connection 5 of the flex spline, the receptacle element 7 functions with its internal gar teeth 4 as an integral part of the gear unit 3.

A third embodiment of the interior of the housing 1 shown in FIGS. 1 and 2 is depicted in FIG. 6, likewise in an exploded view. The drive unit 2 is configured identically to the drive units of the embodiments shown in FIGS. 3 and 4. The drive unit 2 is arranged on a support plate 19, wherein a printed circuit board 12—on which there is a control unit 11 for the drive unit 2—is arranged between the support plate 19 and the cover element 6 of the housing 1. In this embodiment, a planetary gear is used which, in the present case, has a sun wheel 37 and three planet wheels 35. The planet wheels 35 are arranged on a planetary carrier 36 that is likewise configured as a pinion and that has external teeth 5. These external teeth 5 of the planetary carrier 36 are operatively connected to internal teeth of the receptacle element 7 of the housing 1. In this case as well, the receptacle element functions as an integral part of the gear unit 3.

FIG. 7 then shows a top view of another embodiment of the receptacle element 7 of the housing 1, wherein the depiction of the internal teeth 4 arranged on the housing 1 has been dispensed with, even though they are also present in this embodiment. In contrast to the receptacle element 7 of the previous figures, the printed circuit board 12 here with a control unit 11 arranged on it is not arranged perpendicular to the drive shaft 13 or axle of the drive unit 2. Rather, in this embodiment, the printed circuit board 12 is arranged parallel to the drive shaft 13. Here, the printed circuit board 12 is arranged in such a way that it is situated in the housing 1 directly behind the electric terminals 14 and not—as is shown in FIG. 3—axially following the gear unit 3 and the drive unit 2 inside the housing 1.

In this embodiment as well, receptacles 40—of which only one is depicted here—can be present which are configured so as to be offset rotationally symmetrically by 120° and which serve to fasten the drive apparatus to a car body. However, other arrangements of the receptacles 40 are also possible.

LIST OF REFERENCE NUMERALS 1 housing
2 drive unit
3 gear unit
4 internal teeth
5 external teeth
6 cover element
7 receptacle element
8 eccentric gear
9 harmonic gear
10 planetary gear
11 control unit
12 printed circuit board
13 driven shaft
14 electric terminals
15 flex spline
16 ball bearings
17 rotor
18 stator
19 support plate
25 pinion with external teeth 26 first cam
27 second cam
28 eccentric tappet
35 planet wheels
36 planetary carrier
37 sun wheel
40 receptacles

The invention claimed is:

1. A drive apparatus for adjustment devices of motor vehicles, comprising:
an at least two-part housing (1) having a cover element (6) with a flat first surface and a flat second surface opposite the first surface, and a receptacle element (7), wherein an electric drive unit (2) and an operatively connected gear unit (3) are arranged in the receptacle element (7), wherein the receptacle element (7) of the housing (1) is configured as part of the gear unit (3) with a one-piece continuous cylindrical wall with an inner surface that defines an opening to receive a drive shaft (13) of the drive unit (2) said drive shaft (13) having a length and defining an axis along the length, wherein internal teeth (40) are arranged on the inner surface of the cylindrical wall of the receptacle element (7) that are configured to intermesh with external teeth (5) of a part of the gear unit (3), and wherein the cover element (6) and the receptacle element (7) are arranged in a line disposed in a same direction as the drive shaft axis or in a line disposed parallel to the drive shaft axis; and
a control unit (11) for the drive unit (2), wherein the control unit is arranged on a printed circuit board (12) configured as a printed circuit with integrated circuits or with switching circuitry, and wherein the printed circuit board (12) is arranged inside the housing (1) parallel to the drive shaft (13) of the drive unit (2);
wherein the housing (1) is closed by the cover element (6) to retain the printed circuit board (12) inside the housing (1).

2. The apparatus according to claim 1, wherein the drive unit (2) is an electric motor or a brushless electric motor as the drive unit (2).

3. The apparatus according to claim 1, wherein the gear unit (3) comprises a gear selected from the group consisting of an eccentric gear, a cycloid gear (8), a strain wave gear, a harmonic gear (9) and a planetary gear (10).

4. The apparatus according to claim 1, wherein the drive unit (2) is configured rotationally symmetrically to the gear unit (3) inside the at least two-part housing (1).

5. The apparatus according to claim 1, wherein the control unit (11) is arranged on a flexible printed circuit board (12).

6. A component adjustment device for a component of a motor vehicle, comprising: the drive apparatus according to claim 1.

7. The component adjustment device for a component of a motor vehicle according to claim 6, wherein the component is selected from the group consisting of a power window, a cargo area cover, and a sunroof.

8. A method for mounting a drive apparatus for adjustment devices of motor vehicles according to claim 1, comprising: mounting or fastening the adjustment device onto a car body or onto a component connected to the car body before the drive apparatus is mounted on the adjustment device.

9. The method according to claim 8, wherein the drive apparatus is configured to be mounted or fastened on left-hand as well as right-hand variants of the adjustment device of motor vehicles.

10. The method according to claim 8, wherein the adjustment device is a cable-actuated adjustment device with a cable, and the drive apparatus is configured to be installed independently of layout of the cable of the cable-actuated adjustment device.

11. A drive apparatus to adjust a power window, a cargo area cover or a sunroof of a motor vehicle, comprising:
an electric drive unit having a drive shaft of a predetermined length and defining an axis along the length;
a control unit for the drive unit, wherein the control unit is arranged on a printed circuit board configured as a printed circuit with integrated circuits or with switching circuitry:
an operatively connected gear unit with a pinion with external teeth;
a housing for the electric drive unit and the gear unit, said housing having a cover element with a flat first surface and a flat second surface opposite the first surface, and a receptacle element, with the cover element and the receptacle element arranged in a line disposed in a same direction as the drive shaft axis or in a line disposed parallel to the drive shaft axis, wherein the receptacle element defines an opening of a depth sufficient to accommodate the predetermined length of the drive shaft, wherein the opening of the receptacle element accommodates the pinion, and wherein internal gear teeth are arranged on or formed on the receptacle element and are configured to intermesh with the external teeth of the gear unit; and
wherein the printed circuit board is arranged inside the housing parallel to the drive shaft of the drive unit, and the housing is closed by the cover element to retain the printed circuit board inside the housing.

* * * * *